US010292228B2

(12) United States Patent
Yau

(10) Patent No.: US 10,292,228 B2
(45) Date of Patent: May 14, 2019

(54) CIRCUIT FOR IMPROVING STABILITY OF BACKFEED OF DRIVING POWER SUPPLIES

(71) Applicant: Delight Innovative Technologies Limited, Hong Kong (CN)

(72) Inventor: Kin Hing Yau, Hong Kong (CN)

(73) Assignee: Delight Innovative Technologies Limited, Hong Kong (CN)

( * ) Notice: Subject to any disclaimer, the term of this patent is extended or adjusted under 35 U.S.C. 154(b) by 0 days.

(21) Appl. No.: 15/768,344

(22) PCT Filed: Oct. 17, 2016

(86) PCT No.: PCT/CN2016/102289
§ 371 (c)(1),
(2) Date: Apr. 13, 2018

(87) PCT Pub. No.: WO2017/063609
PCT Pub. Date: Apr. 20, 2017

(65) Prior Publication Data
US 2018/0324919 A1    Nov. 8, 2018

(30) Foreign Application Priority Data
Oct. 16, 2015  (CN) .......................... 2015 1 0674564

(51) Int. Cl.
*H05B 33/00*   (2006.01)
*H05B 33/08*   (2006.01)

(52) U.S. Cl.
CPC ......... *H05B 33/0851* (2013.01); *H05B 33/08* (2013.01); *H05B 33/0809* (2013.01)

(58) Field of Classification Search
CPC ............ H05B 33/0815; H05B 33/0842; H05B 37/0263; H05B 37/0245; H05B 33/0827;
(Continued)

(56) References Cited

U.S. PATENT DOCUMENTS

2012/0326618 A1    12/2012   Kim

FOREIGN PATENT DOCUMENTS

CN    101795068 A    8/2010
CN    102647828 A    8/2012
(Continued)

OTHER PUBLICATIONS

International Search Report (and its English translation) and Written Opinion (which indicates all claims patentable) for PCT Application No. PCT/CN2016/102289 filed Oct. 17, 2016 (published as WO 2017063609 on Apr. 20, 2017), dated Jan. 22, 2017, 10 pages.

*Primary Examiner* — Monica C King
(74) *Attorney, Agent, or Firm* — Harness, Dickey & Pierce, P.L.C.; Anthony G. Fussner

(57) ABSTRACT

The invention provides a circuit for improving the stability of the backfeed of driving power supplies, including a reference resistor, a current measuring resistor, a comparator, a logic circuit, a driving circuit and a load, and also including a control circuit, a current limiting resistor, an energy storage capacitor, and a resistor for generating a voltage difference of the residual current, an output end of the comparator is connected to one end of the current limiting resistor, the other end of the current limiting resistor is simultaneously connected to one end of the resistor for generating a voltage difference of the residual current and an input end of the logic circuit, a backfeed voltage between the current limiting resistor and the resistor for generating a voltage difference of the residual current is directed to the logic circuit, the other end of the resistor for generating a voltage difference of the residual current is connected to one end of the energy storage capacitor. The described circuit structure in the invention largely reduces current jitters and suppresses current surges, increases safety and reliability of the circuit.

13 Claims, 2 Drawing Sheets

(58) Field of Classification Search
CPC ............ H05B 33/0818; H05B 33/0884; H05B 33/0812; H05B 33/089; H05B 37/02; H05B 33/0845; H05B 33/0824; H05B 33/0851; H05B 33/0803; H05B 33/0809; H05B 33/0887; H05B 33/08; H05B 33/083; H05B 33/0857; H05B 33/0866; H05B 33/0872; H05B 37/0218; H05B 41/2827; H05B 41/2828; H05B 41/2881; H05B 41/2883; H05B 41/2925; H05B 41/3921

See application file for complete search history.

(56) References Cited

FOREIGN PATENT DOCUMENTS

| | | |
|---|---|---|
| CN | 102695343 A | 9/2012 |
| CN | 203675371 U | 6/2014 |
| CN | 104066234 A | 9/2014 |

CIRCUIT FOR IMPROVING STABILITY OF BACKFEED OF DRIVING POWER SUPPLIES

This patent application is a U.S. national stage filing under 35 U.S.C. § 371 of International Application No. PCT/CN2016/102289 filed Oct. 17, 2016 (published as WO 2017/063609 on Apr. 20, 2017), which claims priority of Chinese application No. CN201510674564.8 filed Oct. 16, 2015. The disclosures of the applications identified in this paragraph are incorporated herein by reference in their entirety.

TECHNICAL FIELD

The present invention relates to a technical field of driving power supplies, and in particular to a circuit for improving the stability of the backfeed of driving power supplies.

BACKGROUND

A driving power supply (for example, a LED driving power supply) refers to a power converter that converts a power supply (for example, high voltage and industrial frequency AC i.e., mains, low voltage and high frequency AC such as an output of an electronic transformer etc.) into specific voltage and current to drive an apparatus or device (e.g. LED lighting), that is, to convert the power supply through a device such as a transformer to a rated power suitable for the operation of the lighting apparatus or device. In order to ensure the safe use of the driving power supply, a backfeed circuit is generally provided in the driving power supply system. The backfeed circuit controls the function and application of the driving power supply according to the back feed (backfeed) result fed back by the corresponding current measuring circuit or voltage measuring circuit (backfeed current or backfeed voltage). A schematic diagram of the structure of a conventional driving power supply backfeed circuit applied to above-described driving power supply is shown in FIG. 1. The circuit includes a driving portion, a power supply portion, and a load portion. Among them, the driving portion provides power to the power supply portion. The driving portion includes an energy supply control circuit, and may also include a power selection circuit and a logic circuit. The power supply portion is responsible for powering the load portion. The power supply portion also includes a current measuring circuit and/or a voltage measuring circuit to provide the backfeed (backfeed current or backfeed voltage) feedback to the driving portion. In the conventional driving power supply backfeed circuit, generally in the Direct Current portion, a corresponding comparator circuit in the current measuring circuit or the voltage measuring circuit is directly used to compare the load current (or voltage) with a preset reference current (or voltage). And the result of the comparison is fed back directly to the driving portion. Due to the direct feedback of the current results, when the driving power supply abnormally works or malfunctions, or when the power is turned on, the current jitter or current surge generated by the backfeed circuit of such a structure will usually result in a deviation of the circuit detection result, thereby resulting in mistakes when backfeeding to the driving portion and when driving energy to the power supply. Even, when the generated current jitter or current surge peak is relatively large, it may easily cause damage to the driving power supply and cause a safety hazard. Therefore, the conventional driving power supply backfeed circuit system does not meet the requirements for the development of the functionality, safety, and reliability of the driving power supply.

SUMMARY OF THE INVENTION

The invention aims at the problem that the existing driving power supply backfeed circuit can not deal with the current jitter or current surge in the circuit due to the direct feedback of current measuring result, thereby causing that the driving power supplies tend to produce malfunctions and accidents, and proposes a novel circuit for improving the stability of the backfeed of driving power supplies. While implementing a current measuring circuit and/or a voltage measuring circuit to provide backfeed feedback to the driving circuit to control the driving output function, the circuit can largely reduce current jitters and suppress current surges by configuring a current limiting resistor, a resistor for generating a voltage difference of the residual current, and an energy storage capacitor, thereby reducing the safety hazards of the circuit. Therefore, the present invention can adapt to the development requirements of functional, safety, and reliability integrated in the driving power supply, thereby improving the service life of the driving power supply device and reducing the cost of the driving power supply system.

The technical solutions of the present invention are as follows:

A circuit for improving the stability of the backfeed of driving power supplies includes a reference resistor, a current measuring resistor, a comparator, a logic circuit, a driving circuit, and a load. One end of the reference resistor is connected to an input power supply. The other end of the reference resistor is connected to an input end of the comparator. One end of the current measuring resistor is connected to the input power supply. The other end of the current measuring resistor is connected simultaneously to the other input end of the comparator and an output end of the load. An input end of the load is connected to an output end of the driving circuit. The circuit for improving the stability of the backfeed of driving power supplies is also characterized in including a control circuit, a current limiting resistor, an energy storage capacitor, and a resistor for generating a voltage difference of the residual current. An output end of the comparator is connected to one end of the current limiting resistor. The other end of the current limiting resistor is simultaneously connected to one end of the resistor for generating a voltage difference of the residual current and an input end of the logic circuit. A backfeed voltage between the current limiting resistor and the resistor for generating a voltage difference of the residual current is directed to the logic circuit. The other end of the resistor for generating a voltage difference of the residual current is connected to one end of the energy storage capacitor. The other end of the energy storage capacitor is grounded. An input end of the driving circuit is connected to an output end of the control circuit. An input end of the control circuit is connected to an output end of the logic circuit.

A constant current source is also included, and the other end of the reference resistor is connected to the constant current source.

A configuration resistor is also included. The control circuit has at least four input ends. The first input end of the control circuit is inputted with a control voltage signal. The second input end of the control circuit is connected to the output end of the logic circuit. The third input end of the control circuit is connected to one end of the configuration resistor. The fourth input end of the control circuit is connected to the other end of the reference resistor. The other end of the configuration resistor is grounded.

The control circuit further has a fifth input end, and the fifth input end of the control circuit is inputted with a dimming voltage signal.

The value of the resistor for generating a voltage difference of the residual current maintains the backfeed voltage ranging from −10 mV to +10 mV.

The value of the configuration resistor maintains its partial voltage of 1V.

The value of the reference resistor maintains its partial voltage of 200 mV.

The logic circuit is an inverter.

The control voltage in the control voltage signal has a value ranging from 0-10V.

The dimming voltage in the dimming voltage signal has a value ranging from 0-10V.

The technical effects of the present invention are as follows:

The present invention provides a circuit for improving the stability of the backfeed of driving power supplies, including a reference resistor, a current measuring resistor, a comparator, a logic circuit, a driving circuit and a load, and also including a control circuit, a current limiting resistor, a resistor for generating a voltage difference of the residual current, and an energy storage capacitor. One end of the reference resistor and one end of the current measuring resistor are both connected to the input power supply. The other end of the reference resistor and the other end of the current measuring resistor are both connected to the input ends of the comparator. The output end of the comparator is connected to one end of the current limiting resistor. The other end of the current limiting resistor is connected simultaneously to one end of the resistor for generating a voltage difference of the residual current and the input end of the logic circuit. A backfeed voltage between the current limiting resistor and the resistor for generating a voltage difference of the residual current is directed to the logic circuit. The other end of the resistor for generating a voltage difference of the residual current is connected to one end of the energy storage capacitor. The other end of the energy storage capacitor is grounded. This circuit no longer directly feeds back the comparison result detected by the comparator of the load current with a certain reference current to the driving control circuit. Instead, through the specific connection of components and their mutual cooperation, and by configuring the current limiting resistor, the resistor for generating a voltage difference of the residual current and the energy storage capacitors to perform the current limiting and the stable trimming, the stable voltage and current are provided. In addition, the voltage between the current limiting resistor and the resistor for generating a voltage difference of the residual current is directed as the backfeed voltage, so that the circuit can largely reduce current jitters and suppress current surges. The control circuit accurately judges the current status of the driving power supply according to the result of the stable backfeed voltage, so that the driving circuit can drive the load, thereby reducing potential circuit safety hazards, adapting to the development requirements of functional, safety, and reliability integrated in the driving power supply, and improving the service life of the driving power supply device and reducing the cost of the driving power supply system.

The circuit for improving the stability of the backfeed of driving power supplies proposed in the present invention can be provided with a constant current source to further improve the stability of the backfeed voltage. Or a control circuit with multiple input ends is provided. The control circuit determines the current state of the LED driving power supply based on the level of the comparator output level. The control circuit generates the driving signal for adjusting the current through the reference voltage, the current state of the LED driving power supply, and the control voltage signal obtained by its own inputs, so that the driving circuit can to drive the load, thereby further improving the stability of the entire backfeed circuit. Moreover, this preferred solution no longer uses a constant current source to provide a constant voltage, thereby avoiding the difference of parameters due to different types of different devices, which will result in the problem of voltage fluctuations, unstable precision, and dissatisfying the different load requirements. By selecting the configuration resistor and the control circuit with multiple inputs, the comparator is also used to monitor the driving supply current for accurate current measuring feedback. Combining the range of control voltages adapted to different applications and the range of dimmer voltages satisfying different illumination lighting requirements, the circuit can be applied to different loads while improving the reliability and versatility of the entire circuit. And the problem of repeated design and development for different application requirements is avoided, and the design cycle and cost are reduced.

DETAILED DESCRIPTION OF EMBODIMENTS

The present invention will be described below with reference to the accompanying drawings.

Figure 1:
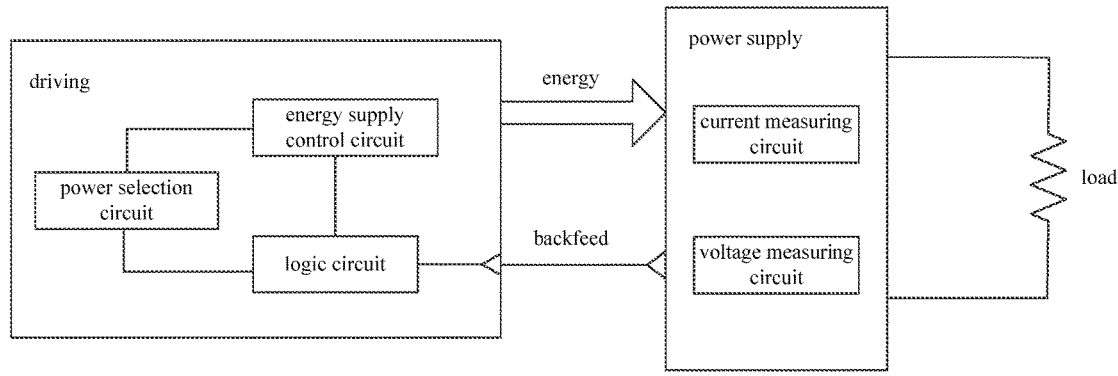
FIG. 1 is a schematic diagram of a structure of a conventional backfeed circuit of a driving power supply.
Figure 2:
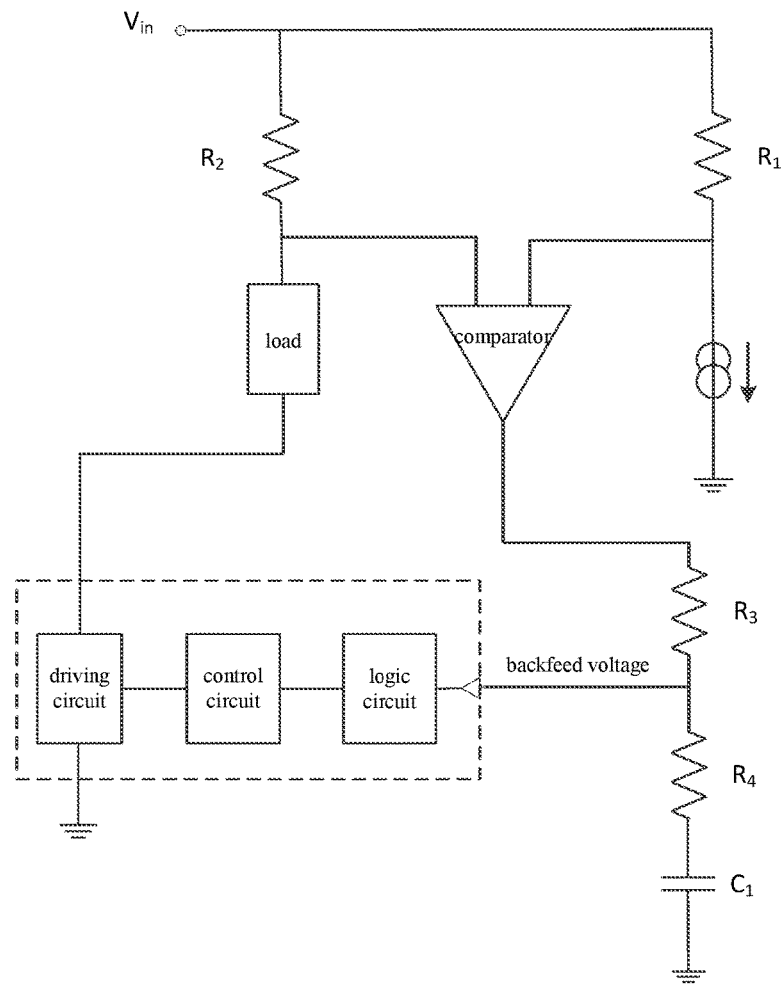
FIG. 2 is a schematic diagram of a first preferred structure of a circuit for improving the stability of the backfeed of driving power supplies according to the present invention.

The present invention relates to a circuit for improving the stability of backfeed of driving power supplies. A schematic diagram of the preferred structure of the circuit is shown in FIG. 2. The circuit includes a reference resistor $R_1$, a current measuring resistor $R_2$, a comparator, a logic circuit, a control circuit, a driving circuit, and a load. The circuit also includes a current limiting resistor $R_3$, a resistor $R_4$ for generating a voltage difference of the residual current, and an energy storage capacitor $C_1$. This embodiment also preferably includes a constant current source. One end of the reference resistor $R_1$ is connected to the input power supply $V_{in}$. The other end of the reference resistor $R_1$ is connected simultaneously to an input end (for example, the in-phase end) of the comparator and the constant current source. One end of the current measuring resistor $R_2$ is connected to the input power supply $V_{in}$. The other end of the current measuring resistor $R_2$ is connected simultaneously to the other input end (for example, the out-phase end) of the comparator and the output end of the load. The input end of the load is connected to the output end of the driving circuit. The input end of the driving circuit is connected to the output end of the control circuit. The input end of the control circuit is connected to the output end of the logic circuit. The output end of the comparator is connected to one end of a current limiting resistor $R_3$. The other end of the current limiting resistor $R_3$ is connected simultaneously to the resistor $R_4$ for generating a voltage difference of the residual current and the input end of the logic circuit. A backfeed voltage between the current limiting resistor $R_3$ and the resistor $R_4$ for generating a voltage difference of the residual current is directed to the logic circuit. The other end of the resistor $R_4$ for generating a voltage difference of the residual current is connected to one end of the energy storage capacitor $C_1$. The other end of the energy storage capacitor $C_1$ is grounded. This circuit no longer directly feeds back the comparison result detected by the comparator of the load current with a certain reference current to the driving control circuit. Instead, by selecting and using the current limiting resistor $R_3$, the resistor $R_4$ for generating a voltage difference of the residual current and the energy storage capacitor $C_1$, the voltage between the current limiting resistor $R_3$ and the resistor $R_4$ for generating a voltage difference of the residual current is directed as the backfeed voltage, the comparator is also used to monitor the current of the driving power supply for implementing the function of accurate current measurement and feedback. At the same time, selecting and properly configuring the circuit structure including the current limiting resistor $R_3$, the resistor $R_4$ for generating a voltage difference of the residual current and the energy storage capacitor $C_1$ can achieve a stable current limiting function of the circuit, thereby avoiding the safety risks of the circuit caused by large current jitters and surges. And the safety, stability and reliability of the circuit are improved.

Preferably, the value of the resistor $R_4$ for generating a voltage difference of the residual current may be selected to maintain the backfeed voltage (input voltage of the logic circuit shown in FIG. 2) ranging from −10 mV to +10 mV. The reference resistor $R_1$ can be selected to maintain its partial voltage of 200 mV. Furthermore, the logic circuit may be an inverter, or it may be a combination logic circuit of one or more inverters, AND gates, OR gates, and/or other such logic gates.

The operating principle of the circuit shown in FIG. 2 according to the present invention will be described below:

When the driving power supply works normally, the reference resistor $R_1$ and the current measuring resistor $R_2$ convert the reference current and the detection current to voltages. Specifically, the reference current is converted into a reference voltage through the reference resistor $R_1$, the detection current is converted into a current measuring voltage (also referred to as a detection voltage) through the current measuring resistor $R_2$. Then, the comparator compares the above two voltage values (i.e., the reference voltage and the current measuring voltage) to determine whether the detection current (i.e., corresponding to the current measuring voltage) is higher than the reference current (i.e., corresponding to the reference voltage), i.e., whether the detection current is within a reasonable range of safety value with respect to the reference current. As shown in FIG. 2, for example, two input ends of the comparator are: an in-phase input end connected to the current measuring resistor $R_2$ (generically identified as"+" end) and an out-phase input end connected to the reference resistor $R_1$ (generally identified as"−" end). When the input voltage at the in-phase input end is greater than the input voltage at the out-phase input end, the comparator outputs a high level. When the input voltage at the in-phase input end is less than the input voltage at the out-phase input end, the comparator outputs a low level. According to the level of the output of the comparator, the current state of the driving power supply can be determined at this time. That is, it is determined whether the detection current (i.e., corresponding to the current measuring voltage) is higher than the reference current (i.e., corresponding to the reference voltage), i.e., whether the detection current is within a reasonable range of safety value with respect to the reference current. Further, after the output level of the comparator is limited and stabilized by the current limiting resistor $R_3$, the resistor $R_4$ for generating a voltage difference of the residual current, and the energy storage capacitor $C_1$, the value of the backfeed voltage (the input voltage of the logic circuit as shown in FIG. 2) is $V_{backfeed}=V_{float}+I_{cntl}*R_4$ (where $V_{float}$ is the floating voltage generated on the storage capacitor $C_1$; $I_{cntl}$ is the current flowing through the current limiting resistor $R_3$ and the resistor $R_4$ for generating a voltage difference of the residual current, i.e., the difference current output by the comparator). When the circuit works normally and the floating voltage generated on the energy storage capacitor $C_1$ gradually rises and gradually approaches a certain target value (gradually approaches and has not reached), the resistor $R_4$ for generating a voltage difference of the residual current generates the voltage difference of the residual current according to the difference current output by the comparator. The voltage difference of the residual current is further compensated to the above mentioned certain target value (i.e., added to the backfeed voltage $V_{backfeed}$ for feedback control). Then the logical level of the backfeed voltage is adjusted by the logic circuit. After that, the control circuit generates a driving signal for adjusting the current according to the received current state of the LED driving power supply, that is, the control circuit adjusts (i.e., increases or decreases the driving current) and controls the driving circuit to drive the load. As shown in FIG. 2, the circuit for improving the stability of the backfeed of driving power supplies according to the present invention uses a constant current source to provide a constant current voltage difference. For example, the reference resistor $R_1$ can be selected to maintain its partial voltage of 200 mV. The constant current voltage difference can be customized according to the different requirements of the reference current.

Figure 3:
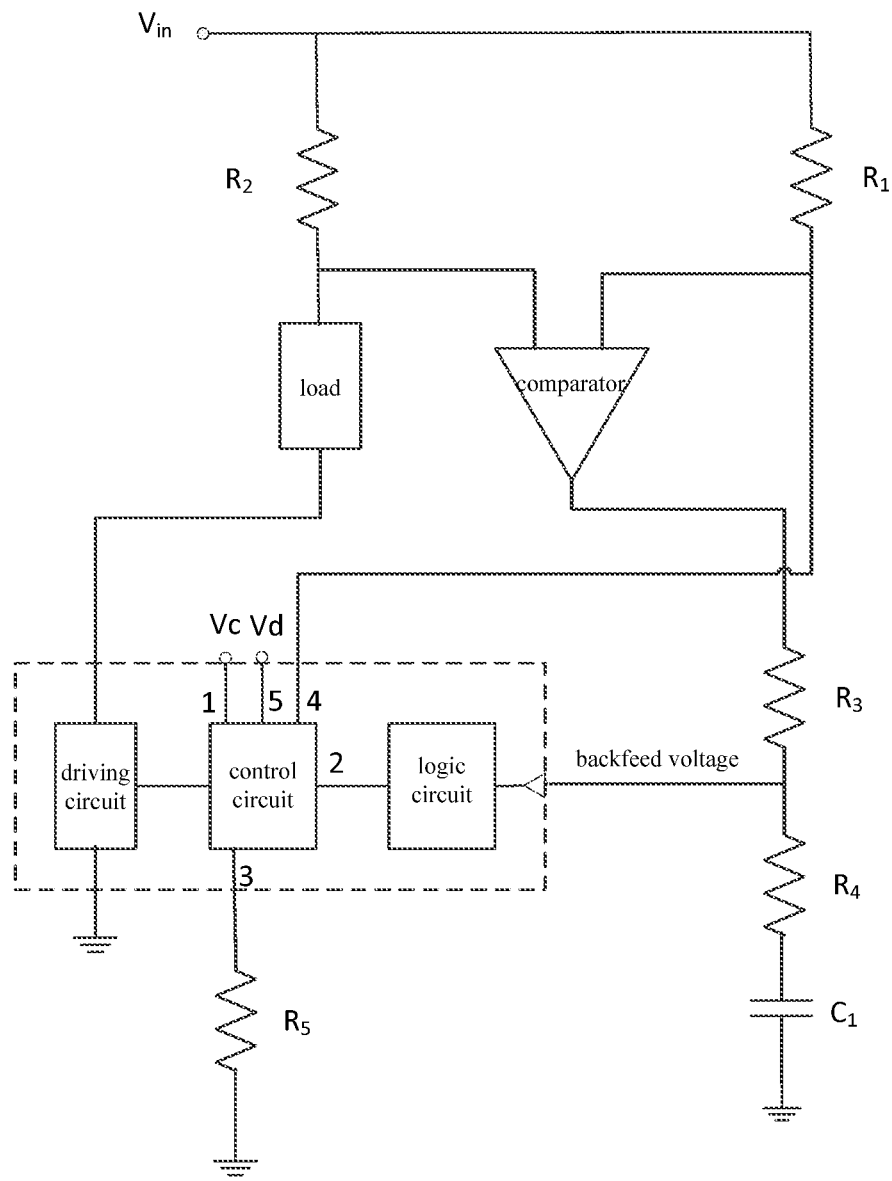
FIG. 3 is a schematic diagram of a second preferred structure of a circuit for improving the stability of the backfeed of driving power supplies according to the present invention.

FIG. 3 is a schematic diagram of a second preferred structure of the circuit for improving the stability of backfeed of driving power supplies according to the present invention. The circuit for improving the stability of backfeed of driving power supplies according to this embodiment includes a reference resistor $R_1$, a current measuring resistor $R_2$, a comparator, a logic circuit, a driving circuit, and a load. The circuit also includes a control circuit, a current limiting resistor $R_3$, a resistor $R_4$ for generating a voltage difference of the residual current, a configuration resistor $R_5$, and an energy storage capacitor $C_1$. The control circuit in this embodiment has five input ends and one output end. Wherein, one end of the reference resistor $R_1$ is connected to the input power supply $V_{in}$. The other end of the reference resistor $R_1$ is connected simultaneously to an input end (for example, an in-phase input end) of the comparator and the fourth input end of the control circuit. One end of the current measuring resistor $R_2$ is connected to the input power supply $V_{in}$. The other end of the current measuring resistor $R_2$ is connected simultaneously to the other input end (for example, the out-phase input end) of the comparator and the output end of the load. The input end of the load is connected to the output end of the driving circuit. The input of the driving circuit is connected to the output end of the control circuit. The first input end of the control circuit is inputted with a control voltage signal (or connection control voltage $V_c$). The fifth input end of the control circuit is inputted with a dimming voltage signal (or connection dimming voltage $V_d$). The second input end of the control circuit is connected to the output end of the logic circuit. The third input end of the control circuit is connected to a branch including the configuration resistor $R_5$. Specifically, the third input end of the control circuit is connected to one end of the configuration resistor $R_5$. The other end of the configuration resistor $R_5$ is grounded. The output end of the comparator is connected to one end of a current limiting resistor $R_3$. The other end of the current limiting resistor $R_3$ is connected simultaneously to one end of the resistor $R_4$ for generating a voltage difference of the residual current and the input end of the logic circuit. A backfeed voltage between the current limiting resistor $R_3$ and the resistor $R_4$ for generating a voltage difference of the residual current is directed to the logic circuit. The other end of the resistor $R_4$ for generating a voltage difference of the residual current is connected to one end of the energy storage capacitor $C_1$. The other end of the energy storage capacitor $C_1$ is grounded. This circuit no longer directly feeds back the comparison result detected by the comparator of the load current with a certain reference current to the driving control circuit. Instead, by selecting and using the current limiting resistor $R_3$, the resistor $R_4$ for generating a voltage difference of the residual current, and the energy storage capacitor $C_1$, and also using the comparator to monitor the current of the driving power supply, the function of accurate current measurement and feedback is implemented. At the same time, selecting and properly configuring the circuit structure including the current limiting resistor $R_3$, the resistor $R_4$ for generating a voltage difference of the residual current and the energy storage capacitor $C_1$ can achieve a stable current limiting function of the circuit, thereby avoiding the safety risks of the circuit caused by large current jitters and surges. And the safety, stability and reliability of the circuit are improved. In addition, the circuit no longer uses a constant current source to provide a constant voltage. Instead, by selecting the configuration resistor $R_5$ and cooperatively using a control circuit having a plurality of inputs in combination with a range of control voltages $V_c$ adapted to different applications and a range of dimmer voltages $V_d$ satisfying different illumination lighting requirements, the current measuring circuit is implemented as such a current measuring circuit that can be applied to different load requirements, and the generality of the current measuring circuit is improved, thereby reducing the design cycle and cost.

Preferably, the value of the resistor $R_4$ for generating a voltage difference of the residual current may be selected to maintain the backfeed voltage (input voltage of the logic circuit as shown in FIG. 3) ranging from −10 mV to +10 mV. The control voltage $V_c$ in the control voltage signal may have a value ranging from 0-10V. The dimming voltage $V_d$ in the dimming voltage signal may have a value ranging from 0-10V. The value of the configuration resistor $R_5$ can be selected to maintain its partial voltage of 1V. The value of the reference resistor $R_1$ can be selected to maintain its partial voltage of 200 mV. Furthermore, the logic circuit may be an inverter, or it may be a combination logic circuit of one or more inverters, AND gates, OR gates, and/or other such logic gates.

The operating principle of the circuit according to the invention shown in FIG. 3 will be described below.

When the driving power supply works normally, the reference resistor $R_1$ and the current measuring resistor $R_2$ convert the reference current and the detection current to voltages. Specifically, the reference current is converted into the reference voltage through the reference resistor $R_1$. The detection current is converted into the current measuring voltage (also referred to as the detection voltage) through the current measuring resistor $R_2$. Then, the comparator compares the above two voltage values (i.e., the reference voltage and the current measuring voltage) to determine whether the detection current (i.e., corresponding to the current measuring voltage) is higher than the reference current (i.e., corresponding to the reference voltage), i.e., whether the detection current is within a reasonable range of safety value with respect to the reference current. As shown in FIG. 3, for example, two input ends of the comparator are: the in-phase input end connected to the current measuring resistor $R_2$ (generically identified as "+" end) and the out-phase input end connected to the reference resistor $R_1$ (generally identified as "−" end). When the input voltage at the in-phase input end is greater than the input voltage at the out-phase input end, the comparator outputs a high level. When the input voltage at the in-phase input end is less than the input voltage at the out-phase input end, the comparator outputs a low level. According to the level of the output of the comparator, the current state of the driving power supply can be determined at this time. That is, it is determined whether the detection current (i.e., corresponding to the current measuring voltage) is higher than the reference current (i.e., corresponding to the reference voltage), i.e., whether the detection current is within a reasonable range of safety value with respect to the reference current. Further, after the output level of the comparator is limited and stabilized by the current limiting resistor $R_3$, the resistor $R_4$ for generating a voltage difference of the residual current, and the energy storage capacitor $C_1$, the value of the backfeed voltage (the input voltage of the logic circuit as shown in FIG. 3) is $V_{backfeed} = V_{float} + I_{cntl} * R_4$ (where $V_{float}$ is the floating voltage generated on the energy storage capacitor $C_1$; $I_{cntl}$ is the current flowing through the current limiting resistor $R_3$ and the resistor $R_4$ for generating a voltage difference of the residual current, i.e., the difference current output by the comparator). When the circuit works normally and the floating voltage generated on the energy storage capacitor $C_1$ gradually rises and gradually approaches a certain target value (gradually approaches and has not reached), the resistor $R_4$ for generating a voltage difference of the residual current generates the voltage difference of the residual current according to the difference current output by the comparator. The voltage difference of the residual current is further compensated to the above mentioned certain target value (i.e., added to the backfeed voltage $V_{backfeed}$ for feedback control). Then the logical level of the backfeed voltage is adjusted by the logic circuit and subsequently inputted to the control circuit. The control circuit generates a driving signal for adjusting the current according to the reference voltage obtained by the fourth input end and the current state of the LED driving power supply obtained by the second input end in combination with the control voltage signal of the first input end and the dimming voltage signal of the fifth input end. That is, the control circuit adjusts (i.e., increases or decreases the driving current) according to the data obtained from the inputs to control the driving circuit to drive the load. As shown in FIG. 3, the circuit for improving the stability of the backfeed of driving power supplies according to the present invention does not use a constant current source to provide a constant current voltage difference. Instead, a stable constant current voltage difference is achieved by the configuration resistor $R_5$ and its associated control circuit. For example, the value of the configuration resistor $R_5$ may be selected to maintain its partial voltage of 1V. The value of the reference resistor $R_1$ can be selected to maintain its partial voltage of 200 mV.

The constant current voltage difference can be customized according to the different requirements of the reference current. In addition, when different driving power supplies are used or a driving power supply is used in applications with different requirements for illumination lighting (e.g., LED illumination lighting), the present invention can satisfy different requirements for current measuring feedback by its control circuit with multiple inputs. For example, when driving different types of illumination lighting apparatuses or devices, the control voltage $V_c$ can be adjusted within the range of 0-10V. When the illumination lighting apparatuses or devices operate in lighting environments with different requirements, the dimming voltage $V_d$ can be adjusted within the range of 0-10V. The above voltage range can be customized according to different application requirements.

It should be noted that the above-described embodiments may make those skilled in the art more fully understand the present invention, but do not limit the invention in any way. Therefore, although the invention has been described in detail in this specification with reference to the accompanying drawings and embodiments, those skilled in the art should understand that modifications or equivalent substitutions can still be made to the invention. In short, all technical solutions and improvements that do not deviate from the spirit and scope of the present invention shall all be covered by the protection scope of the present invention.

The invention claimed is:

1. A circuit for improving the stability of the backfeed of driving power supplies including a reference resistor, a current measuring resistor, a comparator, a logic circuit, a driving circuit, and a load, one end of the reference resistor is connected to an input power supply, the other end of the reference resistor is connected to an input end of the comparator, one end of the current measuring resistor is connected to the input power supply, the other end of the current measuring resistor is connected simultaneously to the other input end of the comparator and an output end of the load, an input end of the load is connected to an output end of the driving circuit, the circuit for improving the stability of the backfeed of driving power supplies is also characterized in including a control circuit, a current limiting resistor, an energy storage capacitor, and a resistor for generating a voltage difference of the residual current, an output end of the comparator is connected to one end of the current limiting resistor, the other end of the current limiting resistor is simultaneously connected to one end of the resistor for generating a voltage difference of the residual current and an input end of the logic circuit, a backfeed voltage between the current limiting resistor and the resistor for generating a voltage difference of the residual current is directed to the logic circuit, the other end of the resistor for generating a voltage difference of the residual current is connected to one end of the energy storage capacitor, the other end of the energy storage capacitor is grounded, an input end of the driving circuit is connected to an output end of the control circuit, an input end of the control circuit is connected to an output end of the logic circuit.

2. The circuit for improving the stability of the backfeed of driving power supplies according to claim 1, further comprising a constant current source, the other end of the reference resistor is connected to the constant current source.

3. The circuit for improving the stability of the backfeed of driving power supplies according to claim 1, further comprising a configuration resistor, the control circuit has at least four input ends, the first input end of the control circuit is inputted with a control voltage signal, the second input end of the control circuit is connected to the output end of the logic circuit, the third input end of the control circuit is connected to one end of the configuration resistor, the fourth input end of the control circuit is connected to the other end of the reference resistor, the other end of the configuration resistor is grounded.

4. The circuit for improving the stability of the backfeed of driving power supplies according to claim 3, wherein the control circuit further has a fifth input end, and the fifth input end of the control circuit is inputted with a dimming voltage signal.

5. The circuit for improving the stability of the backfeed of driving power supplies according to claim 1, wherein the value of the resistor for generating a voltage difference of the residual current maintains the backfeed voltage ranging from −10 mV to +10 mV.

6. The circuit for improving the stability of the backfeed of driving power supplies according to claim 3, wherein the value of the configuration resistor maintains its partial voltage of 1V.

7. The circuit for improving the stability of the backfeed of driving power supplies according to claim 1, wherein the value of the reference resistor maintains its partial voltage of 200 mV.

8. The circuit for improving the stability of the backfeed of driving power supplies according to claim 1, wherein the logic circuit is an inverter.

9. The circuit for improving the stability of the backfeed of driving power supplies according to claim 3, wherein the control voltage in the control voltage signal has a value ranging from 0-10V.

10. The circuit for improving the stability of the backfeed of driving power supplies according to claim 4, wherein the dimming voltage in the dimming voltage signal has a value ranging from 0-10V.

11. The circuit for improving the stability of the backfeed of driving power supplies according to claim 2, wherein the value of the resistor for generating a voltage difference of the residual current maintains the backfeed voltage ranging from −10 mV to +10 mV.

12. The circuit for improving the stability of the backfeed of driving power supplies according to claim 3, wherein the value of the resistor for generating a voltage difference of the residual current maintains the backfeed voltage ranging from −10 mV to +10 mV.

13. The circuit for improving the stability of the backfeed of driving power supplies according to claim 4, wherein the value of the resistor for generating a voltage difference of the residual current maintains the backfeed voltage ranging from −10 mV to +10 mV.

* * * * *